United States Patent
Yamashita

(10) Patent No.: US 10,436,129 B2
(45) Date of Patent: Oct. 8, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Akira Yamashita, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 294 days.

(21) Appl. No.: 15/291,219

(22) Filed: Oct. 12, 2016

(65) Prior Publication Data
US 2017/0159584 A1 Jun. 8, 2017

(30) Foreign Application Priority Data
Dec. 8, 2015 (JP) .................. 2015-239625

(51) Int. Cl.
*F02D 41/00* (2006.01)
*F02D 41/12* (2006.01)

(52) U.S. Cl.
CPC ..... *F02D 41/0002* (2013.01); *F02D 41/0005* (2013.01); *F02D 41/12* (2013.01); *F02D 41/123* (2013.01); *F02D 2200/021* (2013.01); *F02D 2200/0802* (2013.01); *Y02T 10/42* (2013.01)

(58) Field of Classification Search
CPC .. F02D 41/0002; F02D 41/0005; F02D 41/12; F02D 2200/0802; F02D 41/123; F02D 2200/021; Y02T 10/42
USPC ......................................... 123/391
See application file for complete search history.

(56) References Cited

U.S. PATENT DOCUMENTS

| 2,512,739 | A | * | 6/1950 | Duncan | F02F 3/12 |
| | | | | | 123/193.3 |
| 4,502,422 | A | * | 3/1985 | Brann | F01P 3/08 |
| | | | | | 123/193.6 |
| 5,094,206 | A | * | 3/1992 | Buslepp | F02D 9/02 |
| | | | | | 123/325 |

(Continued)

FOREIGN PATENT DOCUMENTS

| EP | 1 536 120 A2 | 6/2005 | |
| FR | 2942270 A1 * | 8/2010 | ........... F02D 35/025 |

(Continued)

*Primary Examiner* — Sizo B Vilakazi
*Assistant Examiner* — Brian R Kirby
(74) *Attorney, Agent, or Firm* — Finnegan, Henderson, Farabow, Garrett & Dunner, LLP

(57) ABSTRACT

A control device determines an operation amount of an actuator that regulates an intake air amount, on the basis of operation conditions of an internal combustion engine. The control device is configured to calculate an index value of a piston temperature of the internal combustion engine, and correct the operation amount to an operation amount that increases the intake air amount, when the calculated index value is a value corresponding to a higher temperature of the piston temperature than a threshold value of the index value corresponding to an upper limit threshold value of the piston temperature, at a time of deceleration in which an engine speed of the internal combustion engine decreases. As the index value, for example, the piston temperature which is estimated from a deviation between an inputted heat amount and a heat release amount of a piston can be used.

6 Claims, 8 Drawing Sheets

(56) References Cited

U.S. PATENT DOCUMENTS

| | | | | |
|---|---|---|---|---|
| 5,335,636 A * | 8/1994 | Bilei | ............... | F01L 13/06 123/321 |
| 5,477,820 A * | 12/1995 | Rao | ............... | F02B 77/11 123/193.2 |
| 5,529,031 A * | 6/1996 | Yoshioka | ............... | F01L 1/34 123/339.24 |
| 6,371,075 B2 * | 4/2002 | Koch | ............... | F01L 9/04 123/198 F |
| 6,389,807 B1 * | 5/2002 | Suzuki | ............... | B60K 6/445 180/65.235 |
| 6,885,964 B2 * | 4/2005 | Ogino | ............... | G01N 25/18 374/11 |
| 7,325,534 B1 * | 2/2008 | Waters | ............... | F01P 5/14 123/198 DB |
| 7,488,273 B2 * | 2/2009 | Carl | ............... | F02D 17/02 477/181 |
| 8,596,041 B2 * | 12/2013 | Tsukamoto | ............... | F02D 41/0005 60/273 |
| 8,863,718 B2 * | 10/2014 | Rebello | ............... | F02F 3/003 123/193.6 |
| 8,932,379 B2 * | 1/2015 | Ikeda | ............... | F01N 3/0253 55/282.3 |
| 9,599,068 B2 * | 3/2017 | Nishida | ............... | F01L 1/34 |
| 2002/0088429 A1 * | 7/2002 | Morikami | ............... | F01P 11/16 123/333 |
| 2002/0163198 A1 * | 11/2002 | Gee | ............... | B60K 6/445 290/400 |
| 2005/0087170 A1 * | 4/2005 | Rammer | ............... | F01L 13/065 123/321 |
| 2005/0120982 A1 * | 6/2005 | Ducu | ............... | F01P 3/08 123/41.08 |
| 2009/0293453 A1 * | 12/2009 | Sujan | ............... | F01N 3/035 60/285 |
| 2010/0030456 A1 * | 2/2010 | Chominsky | ............... | F02D 41/08 701/112 |
| 2011/0232276 A1 * | 9/2011 | Yaguchi | ............... | F02G 1/043 60/517 |
| 2012/0137677 A1 * | 6/2012 | Sato | ............... | F02B 37/18 60/603 |
| 2012/0160092 A1 * | 6/2012 | Kopchick | ............... | B22D 19/0072 92/160 |
| 2012/0174899 A1 * | 7/2012 | Haug | ............... | C22C 38/02 123/668 |
| 2013/0074797 A1 * | 3/2013 | Mordukhovich | ............... | F01M 1/08 123/196 R |
| 2013/0139768 A1 * | 6/2013 | Takemoto | ............... | F01M 1/08 123/41.02 |
| 2013/0190954 A1 * | 7/2013 | Abihana | ............... | B60W 10/06 701/22 |
| 2014/0074378 A1 * | 3/2014 | Iwai | ............... | F02D 43/04 701/104 |
| 2014/0074381 A1 * | 3/2014 | Sczomak | ............... | F02D 41/14 701/105 |
| 2014/0088852 A1 * | 3/2014 | Yaguchi | ............... | F02D 35/023 701/103 |
| 2014/0100765 A1 * | 4/2014 | Maki | ............... | F01M 1/08 701/113 |
| 2014/0182557 A1 * | 7/2014 | Arihara | ............... | F02D 41/047 123/472 |
| 2014/0251240 A1 * | 9/2014 | Bidner | ............... | F01P 3/08 123/41.35 |
| 2014/0257676 A1 * | 9/2014 | Santoso | ............... | F02D 45/00 701/112 |
| 2014/0261315 A1 * | 9/2014 | Willard | ............... | F02D 17/02 123/349 |
| 2015/0045185 A1 * | 2/2015 | Doering | ............... | B60W 10/02 477/181 |
| 2015/0059690 A1 * | 3/2015 | Svensson | ............... | F02D 41/38 123/344 |
| 2015/0152793 A1 * | 6/2015 | Matsuda | ............... | F02D 17/00 60/285 |
| 2015/0275773 A1 * | 10/2015 | Huang | ............... | F02D 29/02 701/104 |
| 2015/0285202 A1 * | 10/2015 | Spohn | ............... | F02D 17/04 123/332 |

FOREIGN PATENT DOCUMENTS

| | | | | |
|---|---|---|---|---|
| FR | 2942270 A1 * | 8/2010 | ............ | F02D 35/025 |
| JP | 2003-83067 | 3/2003 | | |
| JP | 2003083067 A * | 3/2003 | | |
| JP | 2005-155500 | 6/2005 | | |
| JP | 2010048159 A * | 3/2010 | | |

* cited by examiner

CONTROL DEVICE FOR INTERNAL COMBUSTION ENGINE

TECHNICAL FIELD

Embodiments of the present invention relate to a control device for an internal combustion engine.

BACKGROUND

Patent Literature 1 discloses an exhaust emission control device for an internal combustion engine that burns and removes particulate matter (PM) contained in exhaust gas in an exhaust gas purifying catalyst. Air that is contained in exhaust gas exhibits the function of carrying heat in the catalyst away in the process of passing through the exhaust gas purifying catalyst and restraining increase in the catalyst temperature. Consequently, there is the fear that at the time of deceleration of the engine, the amount of exhaust gas decreases, and the temperature of the exhaust gas purifying catalyst excessively increases. In the device of Patent Literature 1, as the countermeasure to the above, control of restraining increase in the intake air amount is performed when the engine decelerates in the state where the accumulation amount of PM is large.

Following is a list of patent literatures which the applicant has noticed as related arts of embodiments the present invention.

Patent Literature 1: JP 2005-155500 A
Patent Literature 2: JP 2003-83067 A

SUMMARY

Incidentally, engine oil is circulated inside the engine. The engine oil has the function of lubricating the components inside the engine and cooling internal components such as a piston. In general, in circulation of engine oil, a mechanical oil pump using the rotational force of an engine is used. In a mechanical oil pump like this, the discharge amount depends on the engine speed, and therefore, the discharge amount from the oil pump decreases in a state where the engine speed is low. Consequently, at the time of deceleration when the engine speed abruptly reduces, the cooling ability by the engine oil is likely to reduce abruptly, and the increase in the piston temperature is likely to become noticeable.

In the art of Patent Literature 1 described above, in order to restrain excessive temperature increase in the exhaust gas purifying catalyst, the intake air amount is decreased during deceleration of the engine. However, when the intake air amount is decreased, the amount of heat carried away from the inside of the cylinder is also reduced, and therefore, the cooling ability of the piston is reduced. Consequently, in the art of Patent Literature 1 described above, the intake air amount is sometimes decreased even when the piston temperature is high, and the piston temperature is likely to increase excessively.

The present invention is made in the light of the above described problem, and has an object to provide a control device for an internal combustion engine that can restrain excessive increase in a piston temperature at a time of deceleration of the internal combustion engine.

In order to achieve the above described object, a first embodiment of the present invention is such that in a control device for an internal combustion engine having an actuator regulating an intake air amount, and determining an operation amount of the actuator on the basis of operation conditions of the internal combustion engine, the control device is configured to:

calculate an index value of a piston temperature of the internal combustion engine; and correct the operation amount to an operation amount that increases the intake air amount, when the index value is a value corresponding to a higher temperature of the piston temperature than a threshold value of the index value corresponding to an upper limit threshold value of the piston temperature, at a time of deceleration in which an engine speed of the internal combustion engine decreases.

A second embodiment of the present invention is such that in the first embodiment, the control device is configured to correct the operation amount so as to increase an extent of increase of the intake air amount more, as the index value is a value corresponding to a higher temperature of the piston temperature than the threshold value of the index value.

A third embodiment of the present invention is such that in the first embodiment, a piston of the internal combustion engine is a piston made of steel.

A fourth embodiment of the present invention is such that in the first embodiment, the control device is configured to perform fuel cut at the time of deceleration.

A fifth embodiment of the present invention is such that in the first embodiment, the control device is configured to calculate the piston temperature which is estimated from a deviation between an inputted heat amount and a heat release amount of the piston of the internal combustion engine as the index value.

A sixth embodiment of the present invention is such that in the first embodiment, the control device is configured to calculate a volumetric efficiency of the internal combustion engine as the index value.

A seventh embodiment of the present invention further includes, in the first embodiment, the control device is configured to correct the operation amount to an operation amount that decreases the intake air amount, when the index value is a value corresponding to a lower temperature of the piston temperature than the threshold value of the index value, and a temperature of a catalyst of the internal combustion engine is lower than a predetermined activating temperature, at the time of deceleration.

According to the first embodiment of the present invention, the operation amount of the actuator is corrected to the operation amount that increases the intake air amount, when the piston temperature is determined as higher than the upper limit threshold value, at the time of deceleration of the internal combustion engine. During deceleration of the internal combustion engine, the cooling performance by engine oil reduces temporarily. In this case, the piston temperature excessively increases temporarily, and the engine performance is likely to reduce. Meanwhile, if piston cooling is performed more than necessary, the fear of reduction of output performance is increased by increase of cooling loss. According to this embodiment, whether or not to increase the intake air amount is determined after it is determined whether or not the piston temperature excessively increases by using the index value of the piston temperature, and therefore excessive temperature increase of the piston temperature can be restrained while increase of cooling loss is prevented.

According to the second embodiment of the present invention, the control device is configured to increase an extent of increase of the intake air amount more, as the piston temperature is higher. Consequently, according to this embodiment, control of piston cooling corresponding to an extent of excessiveness of the piston temperature is enabled.

According to the third embodiment of the present invention, in the internal combustion engine, a piston made of steel is used. The piston made of steel has a low heat conductivity, and therefore has a characteristic that the temperature of the piston easily increases, but hard to decrease. Consequently, according to this embodiment, an excessive temperature increase of the piston made of steel the piston temperature of which easily increases excessively can be restrained.

According to the fourth embodiment of the present invention, the operation amount of the actuator is corrected to the operation amount which increases the intake air amount, when the piston temperature is determined as higher than the upper limit threshold value in the period in which fuel cut is performed during deceleration of the internal combustion engine. In the operation condition in which fuel cut is performed during deceleration of the internal combustion engine, an effect of engine brake is sometimes enhanced by decreasing the target intake air amount, and the piston temperature easily increases. According to this embodiment, even in the case of the operation conditions in which an excessive increase of the piston temperature readily occurs, the excessive temperature increase of the piston temperature can be effectively restrained. Further, since fresh air blows through the inside of the cylinder during fuel cut, the cooling performance of the piston can be enhanced more by increasing the intake air amount in the fuel cut period.

According to the fifth embodiment of the present invention, the piston temperature can be estimated precisely on the basis of the deviation between the inputted heat amount to the piston and the heat release amount.

According to the sixth embodiment of the present invention, the volumetric efficiency of the internal combustion engine is used as the index value of the piston temperature. The volumetric efficiency at the time of deceleration of the internal combustion engine has a correlation with the piston temperature. Consequently, according to this embodiment, the piston temperature can be determined precisely on the basis of the volumetric efficiency.

According to the seventh embodiment of the present invention, the operation amount of the actuator is corrected to the operation amount that decreases the intake air amount, when the piston temperature is determined as lower than the upper limit threshold value at the time of deceleration, and the temperature of the catalyst of the internal combustion engine is lower than the predetermined activating temperature. Consequently, according to this embodiment, temperature reduction of the catalyst can be effectively restrained in the conditions in which an excessive increase of the piston temperature does not occur.

DESCRIPTION OF EMBODIMENTS

Hereinafter, embodiments of the present invention will be described with reference to the drawings. Note that when the numerals of the numbers, the quantities, the amounts, the ranges and the like of the respective elements are mentioned in the embodiment shown as follows, the present invention is not limited to the mentioned numerals unless specially explicitly described otherwise, or unless the invention is explicitly specified by the numerals theoretically. Further, structures, steps and the like that are described in the embodiment shown as follows are not always indispensable to the present invention unless specially explicitly shown otherwise, or unless the invention is explicitly specified by them theoretically.

First Embodiment

[Configuration of System]

Figure 1:
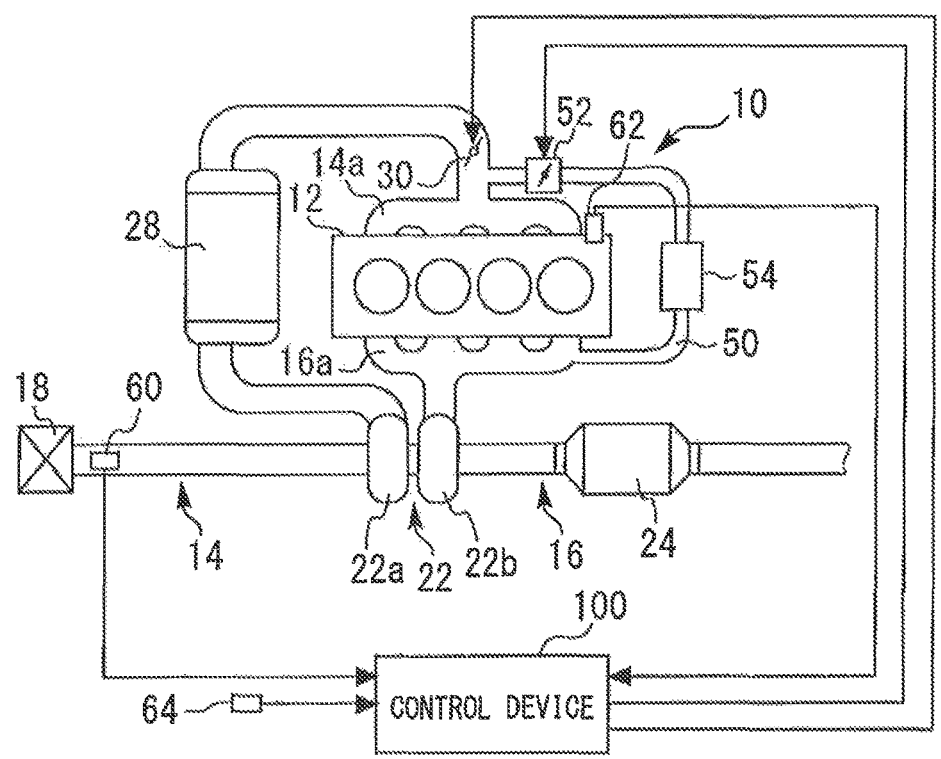
FIG. 1 is a diagram showing a configuration of a system of a first embodiment of the present invention.

FIG. 1 is a diagram showing a configuration of a system of a first embodiment of the present invention. The system shown in FIG. 1 includes an internal combustion engine 10. The internal combustion engine 10 is a diesel engine, is mounted on a vehicle and is used as a power plant of the vehicle. An intake passage 14 and an exhaust passage 16 are connected to an engine main body 12 of the internal combustion engine 10. Although four cylinders are drawn in the engine main body 12 in FIG. 1, this is only an example, and the number of cylinders of the internal combustion engine according to the present invention is not limited. Pistons (not illustrated) made of steel are disposed inside the respective cylinders.

An air cleaner 18 is provided at an inlet of the intake passage 14. A compressor 22a of a turbocharger 22 for turbocharging intake air is disposed in the intake passage 14 at a downstream side from the air cleaner 18. The turbocharger 22 includes a turbine 22b in the exhaust passage 16. The compressor 22a is connected integrally to the turbine 22b via a connecting shaft, and is driven by exhaust gas that flows to the turbine 22b.

An intercooler 28 for cooling the compressor 22a, or air which is compressed by the compressor 22a is disposed in the intake passage 14 at a downstream side from the compressor 22a. An electronically controlled type throttle 30 that opens and closes the intake passage 14 is disposed in the intake passage 14 at a downstream side from the intercooler 28. The throttle 30 functions as an actuator that regulates an intake air amount. The intake passage 14 at a downstream side from the throttle 30 is configured as an intake manifold 14a, and intake air is distributed to the respective cylinders via the intake manifold 14a.

Exhaust gas from the respective cylinders are collected by an exhaust manifold 16a of the exhaust passage 16 and is fed to the turbine 22b. The exhaust manifold 16a is connected to the intake passage 14 between the throttle 30 and the intake manifold 14a by an EGR passage 50. In the EGR passage 50, an EGR cooler 52 for cooling EGR gas is disposed. In the EGR passage 50 at a downstream side from the EGR cooler 52, an EGR valve 54 that opens and closes the EGR passage 50 is disposed. An exhaust gas purifying catalyst 24 is provided in the exhaust passage 16 at a downstream side from the turbine.

Sensors for obtaining information on an operation state of the internal combustion engine 10 are attached to respective places, in the internal combustion engine 10. An air flow meter 60 for measuring a flow rate of fresh air which is taken into the intake passage 14 is attached downstream of the air cleaner 18 in the intake passage 14. Further, a crank angle sensor 62 that detects rotation of a crankshaft, an accelerator opening degree sensor 64 which outputs a signal corresponding to an opening degree of an accelerator pedal and the like are also provided.

The system shown in FIG. 1 includes a control device 100 that controls the internal combustion engine 10. The control device 100 is an ECU. The control device 100 has at least an input/output interface, a memory and a CPU. The input/output interface is provided to take in sensor signals from various sensors attached to the internal combustion engine 10 or a vehicle, and output operation signals to actuators included by the internal combustion engine 10. In the memory, various control programs for controlling the internal combustion engine 10 and maps are stored. The CPU reads a control program from the memory, executes the control program, and generates operation signals on the basis of the sensor signals which are taken in.

[System Operation of Embodiments]
(Piston Temperature)

The pistons are disposed in the cylinders of the internal combustion engine 10, and therefore cannot be directly cooled by cooling water. Consequently, engine oil is used to cool the pistons. In more detail, inside the engine main body 12 of the internal combustion engine 10, engine oil is circulated. The engine oil is pumped up by an oil pump, and is injected from an oil jet toward a cooling channel on back faces of the pistons. Thereby, the pistons are cooled, and respective components of the engine main body 12 are lubricated.

When the piston temperature excessively increases, the engine oil is carbonized and adheres to the pistons, and as a result, engine performance is likely to be reduced. On the other hand, when the piston temperature is excessively reduced, cooling loss increases and engine performance is reduced. Consequently, various specifications of the internal combustion engine 10, such as a material of the pistons, and an ability of the oil pump are determined so that the piston temperature is in a suitable temperature range in an ordinary operation state.

Figure 2:
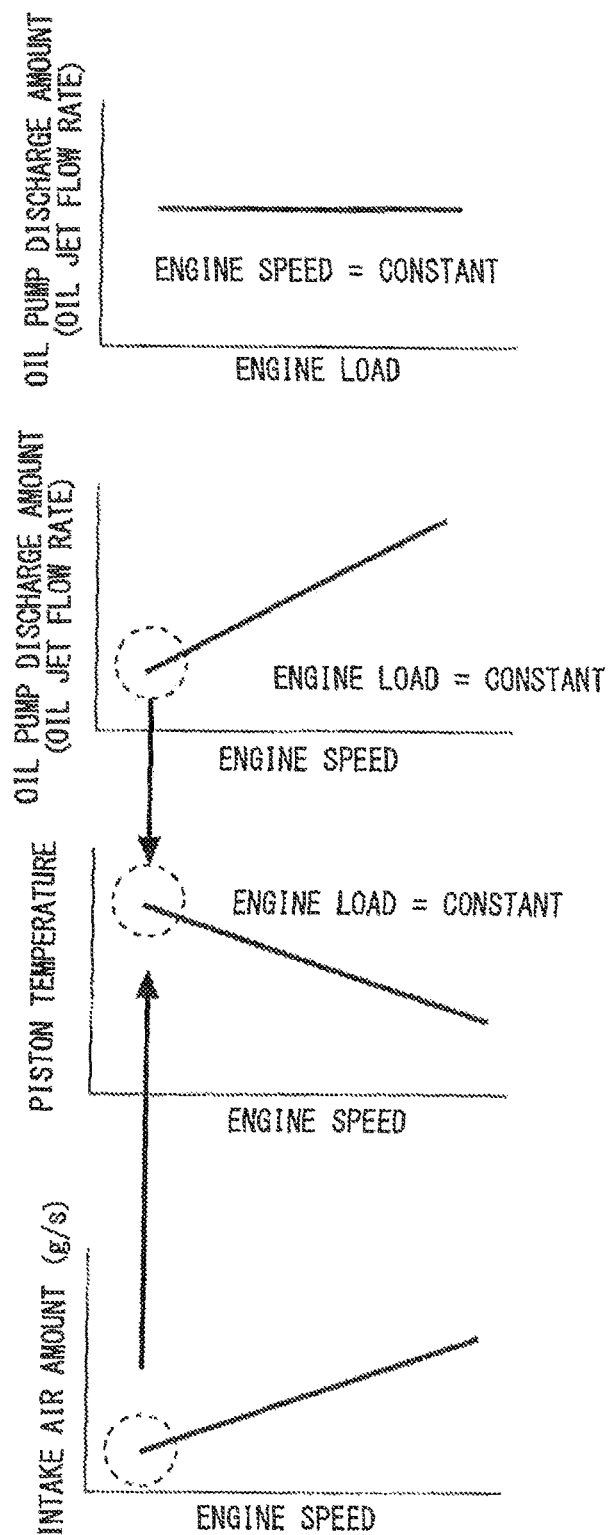
FIG. 2 is a diagram for explaining a variation factor of a piston temperature.

Here, when the oil pump is of a mechanical type that uses a rotational force of the internal combustion engine 10, the piston temperature significantly varies depending on the operation state of the internal combustion engine 10. FIG. 2 is a diagram for explaining variation factors of the piston temperature. In the drawing, a first diagram shows a change of a discharge amount (an outflow amount from the oil jet) of the oil pump to an engine load, a second diagram shows a change of discharge amount of the oil pump to an engine speed, a third diagram shows a change of the piston temperature to the engine speed, and a fourth diagram shows a change of the intake air amount to the engine speed, respectively.

As shown in the first diagram of FIG. 2, the discharge amount of the oil pump does not depend on the engine load. Consequently, in a condition that the engine speed is constant, the discharge amount of the oil pump is constant to a change of the engine load. Meanwhile, as shown in the second diagram of FIG. 2, the discharge amount of the oil pump depends on the engine speed. Consequently, in a condition that the engine load is constant, the discharge amount of the oil pump becomes larger as the engine speed becomes larger.

Further, as shown in the fourth diagram of FIG. 2, the intake air amount depends on the engine speed. In more detail, the intake air amount depends on the engine speed and the engine load, and dependence on the engine speed becomes large at a time of deceleration. Consequently, when the engine speed decreases, the intake air amount decreases with this.

In this way, when the engine speed decreases, the discharge amount of the oil pump and the intake air amount decrease with this. That is, at the time of deceleration of the internal combustion engine 10 in which the engine speed decreases, the discharge amount (oil jet flow rate) of the oil pump decreases, and therefore cooling performance of the piston is also reduced. Further, when the intake air amount decreases, a heat release amount from the cylinders also decreases, and therefore the cooling performance of the piston is reduced. Consequently, as shown in the third diagram of FIG. 2, during reduction of the engine speed in the condition that the engine load is constant, the piston temperature increases.

Figure 3:
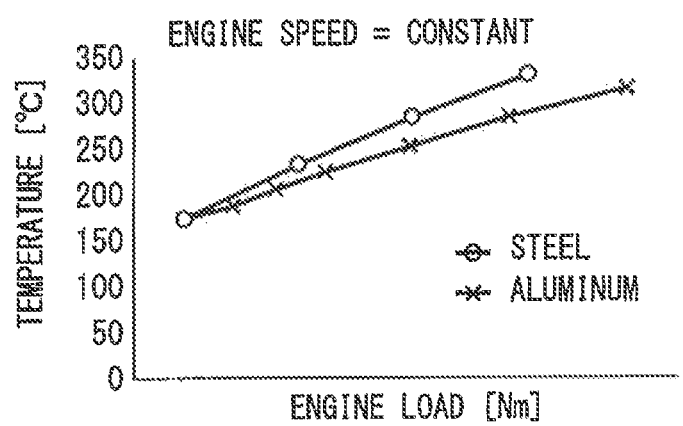
FIG. 3 is a diagram showing a change of the piston temperature with respect to an engine load according to material of a piston.
Figure 4:
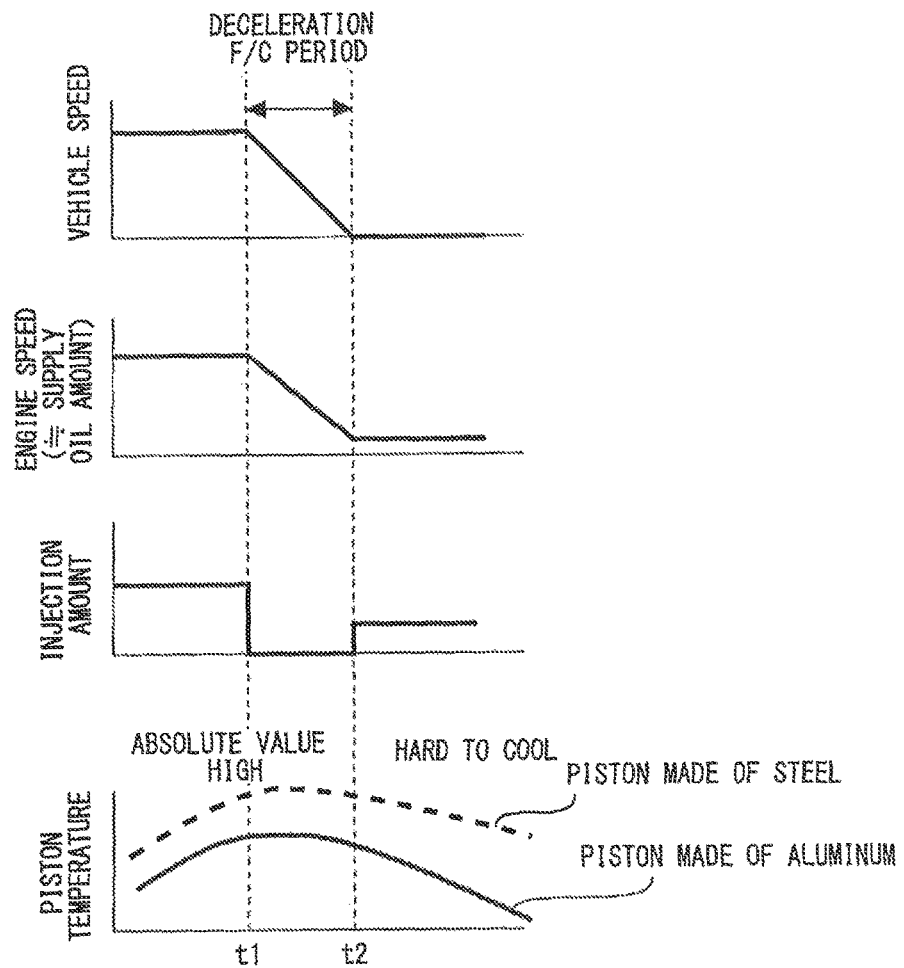
FIG. 4 is a time chart showing changes of various state quantities at a time of deceleration of a vehicle.

Further, the change of the piston temperature also varies depending on the material of the piston. FIG. 3 is a diagram showing the change of the piston temperature to the engine load according to material of the piston. As shown in FIG. 3, the piston temperature to the engine load is higher throughout an entire region in a piston made of steel (iron) than in a piston made of aluminum. This is because steel is lower in heat conductivity than aluminum. Consequently, in the internal combustion engine 10 using the pistons made of steel (iron), increase of the piston temperature at the time of reduction of the engine speed appears more remarkably. FIG. 4 is a time chart showing changes of various state quantities at the time of deceleration of the vehicle. A first chart shows a time chart of a vehicle speed, a second chart shows a time chart of the engine speed, a third chart shows a time chart of an injection amount, and a fourth chart shows a time chart of the piston temperature, respectively.

In the time charts, the vehicle speed decreases in a period from a time t1 and a time t2, and with this, the engine speed also decreases. Further, in a deceleration period from the time t1 to the time t2, fuel cut (F/C) that stops injection of fuel is performed. Hereinafter, the period from the time t1 to the time t2 will be referred to as "a deceleration F/C period". The fourth chart shows a difference between the piston temperatures of the piston made of steel and the piston made of aluminum. As shown in the fourth chart, the piston made of steel has a higher temperature absolute value throughout the entire region than the piston made of aluminum. Further, the difference between the piston temperatures of the piston made of steel and the piston made of aluminum is larger at the time t2 when the deceleration F/C period is ended than at the time t1 when the deceleration FC period is started. This shows that the piston made of steel is lower in heat dissipation ability (harder to cool) than the piston made of aluminum. As above, the piston made of steel has a higher possibility of the piston temperature excessively increasing when the cooling ability by engine oil is reduced at the time of deceleration of the internal combustion engine 10.

(Characteristic Operation of System of First Embodiment)

Control executed by the control device 100 includes intake air amount control. The intake air amount control is control of determining an operation amount of the throttle 30 on the basis of the operation conditions of the internal combustion engine 10, and in more detail, is control of operating the throttle 30 so that an actual intake air amount passing through the throttle 30 becomes a target intake air amount. The target intake air amount is determined from a map on the basis of the operation conditions (the fuel injection amount and the engine speed) of the internal combustion engine 10 which are calculated from the sensor signals of the crank angle sensor 62, the accelerator opening degree sensor 64 and the like. In the intake air amount control, the operation amount of the throttle 30 for making the actual intake air amount passing through the throttle 30 which is detected by using the sensor signal or the like of the air flow meter 60, become the target intake air amount, is determined. The operation amount of throttle 30 is a closing degree of the throttle 30, in more detail, a closing degree to a fully opened position in a case where the fully opened position is set as a basic position.

Figure 5:
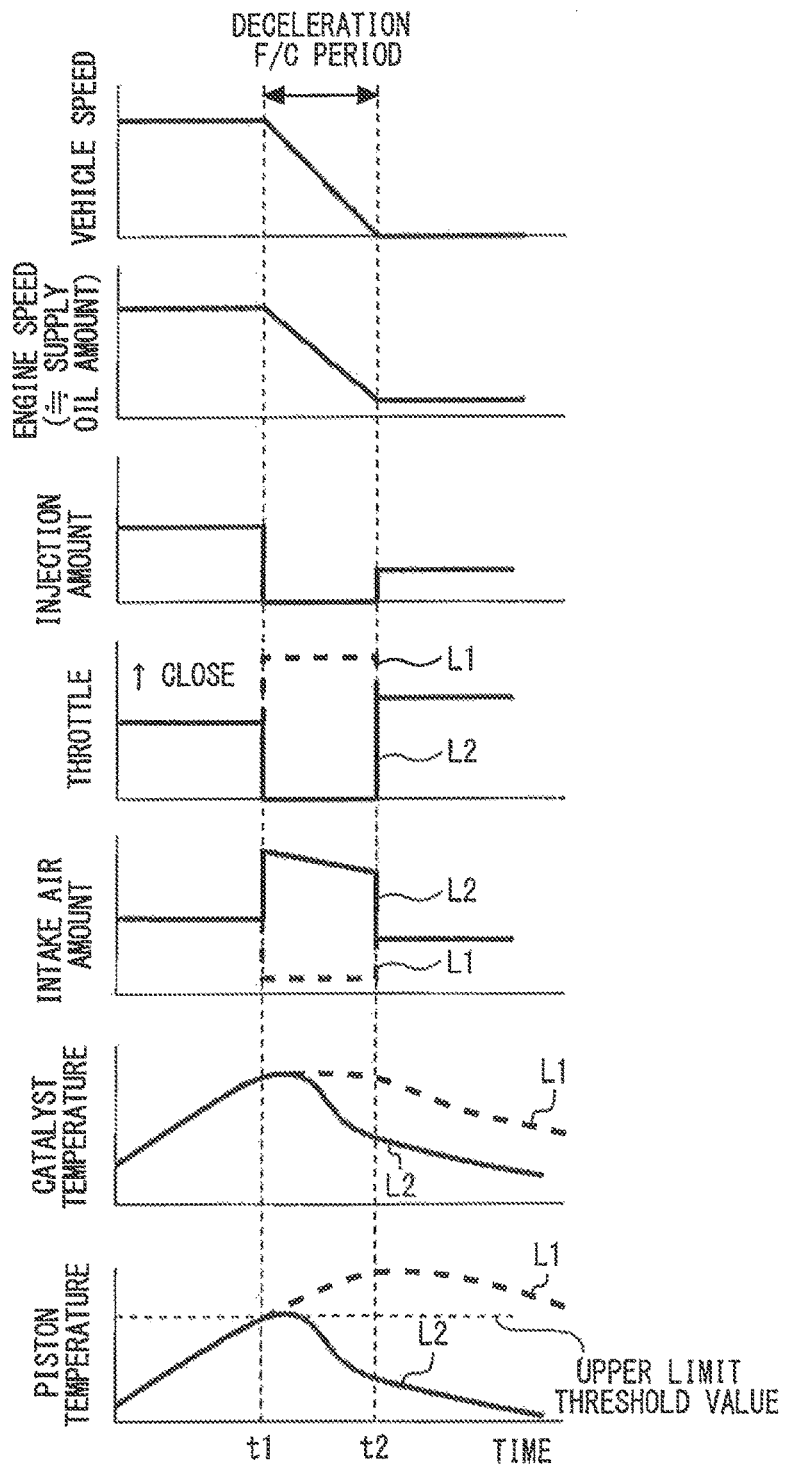
FIG. 5 is a time chart showing changes of the various state quantities in a case of executing piston cooling control.

Here, as described above, during the deceleration F/C period, the piston temperature sometimes increases excessively. In particular, in the operation conditions in which the internal combustion engine 10 decelerates from a state where the internal combustion engine 10 performs a continuous operation by a high load and high rotation, the piston temperature easily increases excessively. Thus, in the system of the present embodiment, intake air amount increase control for increasing a cooling amount of the piston when the piston temperature increases excessively. FIG. 5 is a time chart showing changes of various state quantities in a case of executing piston cooling control. In FIG. 5, a first chart shows a time chart of the vehicle speed, a second chart shows a time chart of the engine speed, a third chart shows a time chart of the injection amount, a fourth chart shows a time chart of the throttle closing degree, a fifth chart shows a time chart of the intake air amount, a sixth chart shows a time chart of a catalyst temperature, and a seventh chart shows a time chart of the piston temperature, respectively. Further, a chain line L1 in FIG. 5 shows a chart in a case of executing ordinary intake air amount control, and a solid line L2 shows a chart in a case of executing the intake air amount increase control, respectively.

Chain lines L1 in FIG. 5 show charts in the case where ordinary intake air amount control is executed. In this case, the control device 100 operates the throttle 30 to a closing side in the deceleration F/C period between the time t1 and the time t2. Thereby, the intake air amount is decreased, and therefore the catalyst temperature is kept at a high temperature. However, when the intake air amount is decreased, the cooling performance of the piston is reduced, and therefore the piston temperature excessively increases to exceed an upper limit threshold value.

In contrast with the above, solid lines L2 in FIG. 5 show charts in a case where intake air amount increase control is executed. In intake air amount increase control, the control device 100 accepts the fact that the piston temperature exceeds the upper limit threshold value at the time of deceleration of the internal combustion engine 10, and corrects the closing degree of the throttle 30 to a degree to increase the intake air amount (that is, to an opening side). In more detail, the control device 100 corrects the target intake air amount which is determined from the map to a larger amount. As the upper limit threshold value of the piston temperature, a value that is determined in advance as an upper limit temperature of the piston temperature that can ensure reliability of the internal combustion engine 10 is used. When the target intake air amount is increased, the throttle 30 is operated to open more than in the case where the target intake air amount is not increased. Since the intake air amount is increased thereby, cooling performance by intake air is increased and an increase of the piston temperature is restrained.

When the intake air amount is increased, the catalyst temperature of the exhaust gas purifying catalyst 24 is reduced by increase in the exhaust gas amount. Consequently, in the intake air amount increase control, the intake air amount is preferably increased within a range in which the catalyst temperature does not become lower than an activating temperature. Further, in the intake air amount increase control, control is preferably performed such that an extent of increase of the intake air amount becomes larger when the piston temperature is higher. Thereby the cooling performance by intake air can be more enhanced when the piston temperature is higher, and therefore, an excessive increase of the piston temperature can be effectively restrained.

(Specific Processing of System of First Embodiment)

Figure 6:
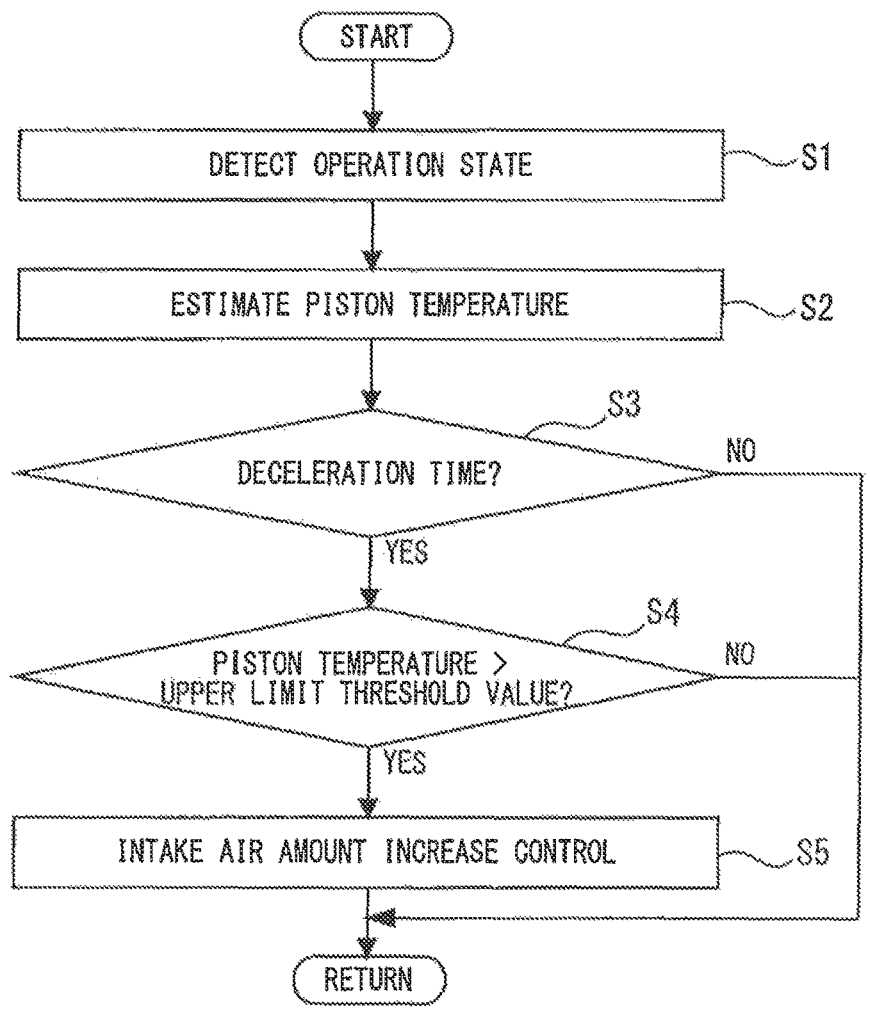
FIG. 6 is a flowchart of a routine which the system of the first embodiment of the present invention executes when performing piston cooling control.

Next, specific processing of piston cooling control that is executed in the system of the first embodiment will be described. FIG. 6 is a flowchart of a routine which the system of the present embodiment executes when performing piston cooling control. The routine shown in FIG. 6 is repeatedly executed at predetermined control periods by the control device 100.

In the routine shown in FIG. 6, the operation state of the internal combustion engine 10 is detected (step S1). Here, specifically, as various data necessary for the piston cooling control, the engine speed, the fuel injection amount, the intake air amount and the like are acquired. Next, the piston temperature at present is estimated (step S2). Here, specifically, the piston temperature is estimated on the basis of an inputted heat amount to the piston and a heat release amount. The inputted heat amount to the piston can be estimated by using the engine speed, the fuel injection amount, and the intake air amount, for example. Further, the heat release amount of the piston can be estimated by using an oil amount, an oil temperature and the like of the engine oil. Since a deviation obtained by subtracting the heat release amount from the inputted heat amount is a heat amount that is held by the piston, the piston temperature can be estimated from the heat amount.

Next, it is determined whether or not the internal combustion engine 10 is under deceleration (step S3). Determination of whether or not the internal combustion engine 10 is under deceleration can be made by determining whether or not a change rate of the engine speed is smaller than a predetermined value (a negative value). The predetermined value in this case is a threshold value of the change rate of the engine speed for determining whether or not the piston temperature is likely to increase excessively, and a value which is set in accordance with the specifications or the like of the respective components configuring the internal combustion engine 10 is used. When establishment of the condition in step S3 is not recognized as a result, it is determined that the piston temperature is unlikely to increase excessively, and the present routine is quickly ended.

When establishment of the condition in step S3 described above is recognized, it is determined that the piston temperature is likely to increase excessively, the flow goes to a next step, and it is determined whether or not the piston temperature calculated in step S2 described above is a value of a higher temperature than the upper limit threshold value of the piston temperature described above (step S4). When establishment of the condition in step S4 is not recognized as a result, it is determined that the piston temperature does not increase excessively, and the present routine is quickly ended.

When establishment of the condition in step S4 described above is recognized, it is determined that the piston temperature increases excessively, the flow goes to a next step, and intake air amount increase control is performed (step S5). Here, specifically, the target intake air amount is increased so that an extent of increase becomes larger as the piston temperature estimated in step S2 is higher. Thereby, the throttle 30 is operated to open more than in the case where the intake air amount increase control is not performed.

As above, according to the system of the first embodiment, the intake air amount is increased when the piston temperature is likely to increase excessively, and therefore, an excessive temperature increase of the piston is restrained by enhancement of cooling performance by intake air. Further, since it is precisely determined whether or not the piston temperature increases excessively by using the piston temperature, cooling loss can be restrained from increasing as a result of intake air amount increase control being executed when it is not necessary to enhance piston cooling performance.

Although in the system of the first embodiment described above, the example of adopting a diesel engine as the internal combustion engine 10 is described, the present invention also can be applied to other reciprocating engines such as a gasoline engine. This similarly applies to a system of a second embodiment that will be described later.

Further, in the system of the first embodiment described above, the closing degree of the throttle 30 is operated to the degree that increases the intake air amount by correcting the target intake air amount to a larger amount. However, the method for operating the closing degree of the throttle 30 to the degree which increases the intake air amount is not limited to the above, but the throttle closing degree which is the operation amount of the throttle 30 may be corrected to a predetermined closing degree (for example, full opening) which increases the intake air amount. This similarly applies to the system of the second embodiment which will be described later.

Further, although in the system of the first embodiment described above, the internal combustion engine 10 using pistons made of steel is described as an example, the present invention also can be applied to pistons of other materials such as a piston made of aluminum. This similarly applies to the system of the second embodiment which will be described later.

Further, although in the system of the first embodiment described above, the throttle 30 is used as the actuator for intake air amount control, the actuator which is usable is not limited to this. That is, as long as the actuators can vary the intake air amount, other actuators such as an EGR valve 54 may be used; in place of the throttle 30 or in addition to the throttle 30. When the EGR valve 54 is used as the control target actuator of intake air amount increase control, the opening degree of the EGR valve 54 can be operated to an opening degree which closes the EGR valve 54 more as the piston temperature is higher. This similarly applies to the system of the second embodiment which will be described later.

Figure 7:
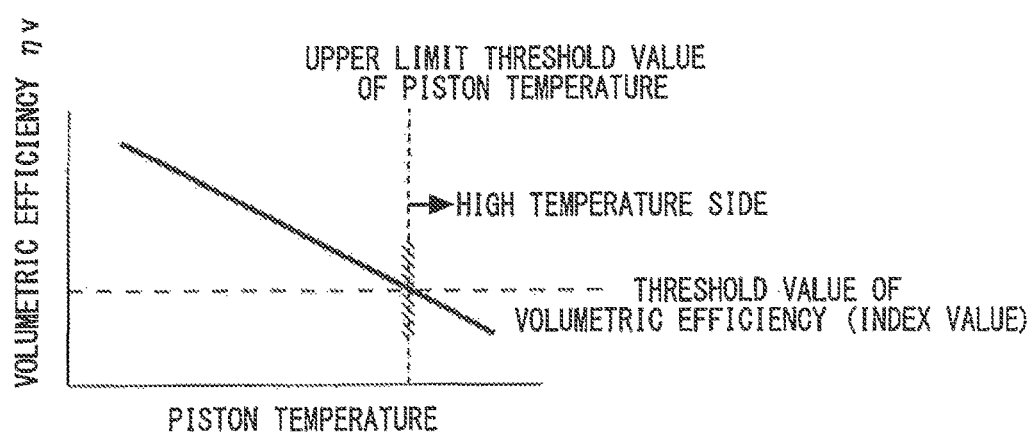
FIG. 7 is a diagram showing a relationship between the piston temperature and a volumetric efficiency ηV.

Further, in the system of the first embodiment described above, the piston temperature is estimated by using the inputted heat amount and the heat release amount of the piston, and whether or not to execute intake air amount increase control is determined by using the estimated piston temperature. However, the above described determination is not limited to the case of directly estimating the piston temperature, but may be configured to use an index value that has a correlation with the piston temperature and can be an index of the piston temperature. The index value like this includes an estimated value of the piston temperature described above, and as another index value, a volumetric efficiency $\eta V$ can be cited, for example. FIG. 7 is a diagram showing a relationship between the piston temperature and the volumetric efficiency $\eta V$. As shown in the drawing, the volumetric efficiency $\eta V$ is correlated with the piston temperature, and has such a relationship that as the piston temperature is higher, the volumetric efficiency $\eta V$ has a lower value. Consequently, if a value of the volumetric efficiency $\eta V$ corresponding to an upper limit threshold value of the piston temperature is grasped as a threshold value of the index value, it becomes possible to determine whether or not to execute intake air amount increase control by determining whether or not the calculated volumetric efficiency $\eta V$ is a value corresponding to a higher temperature of the piston temperature than the threshold value of the index value. This similarly applied to the system of the second embodiment which will be described later.

When the volumetric efficiency $\eta V$ is used as the index value of the piston temperature, in the flowchart shown in FIG. 6, the volumetric efficiency $\eta V$ is calculated in step S2, and it can be determined whether or not the volumetric efficiency $\eta V$ which is calculated is smaller than a value (a threshold value of the index value) of the volumetric efficiency $\eta V$ corresponding to the upper limit threshold value of the piston temperature in step S4. In this case, the volumetric efficiency $\eta V$ corresponds to an "index value" of a first embodiment of the present invention, and "control device" of the first embodiment of the present invention is realized by the control device 100 executing the processing of step S2 described above.

Further, although in the system of the first embodiment described above, it is determined whether or not it is the time of deceleration of the internal combustion engine 10, in the determination of whether or not to execute intake air amount increase control, a configuration of determining whether or not it is the time of deceleration with fuel cut may be adopted. That is, at the time of deceleration with fuel cut, the influence which increase of the intake air amount has on fuel efficiency performance and exhaust emission performance can be small. Further, since fresh air blows through the insides of the cylinders during fuel cut, heat release from the pistons is promoted more. Consequently, if intake air amount increase control is performed at the time of deceleration with fuel cut, it becomes possible to enhance cooling performance of the piston more while restraining an influence on fuel efficiency and exhaust emission performance. In this case, in step S3 of the flowchart shown in FIG. 6, it can be determined whether or not it is the deceleration F/C period. This similarly applies to the system of the second embodiment which will be described later.

Further, although in the system of the first embodiment described above, execution of the intake air amount increase control is ended when it is not the time of deceleration of the internal combustion engine 10, or when the piston temperature becomes the upper limit threshold value or less during execution of the intake air amount increase control as shown in the flowchart in FIG. 6, the timing for end of the intake air amount increase control is not limited to this. That is, as long as an excessive increase of the piston temperature can be restrained, a configuration in which the timing for end is determined by, for example, comparing the piston temperature and the deceleration extent of the internal combustion engine, and another threshold value may be adopted, or a configuration in which the control is continued for a predetermined time period from an initial start may be adopted. This similarly applies to the system of the second embodiment which will be described later.

In the system of the first embodiment described above, the estimated piston temperature corresponds to the "index value" of the first embodiment of the present invention, the "control device" of the first embodiment of the present invention is realized by the control device 100 executing the processing of step S2 described above, and "control device" of the first embodiment of the present invention is realized by the control device 100 executing processing of steps S3, S4 and S5 described above.

Second Embodiment

[Feature of Second Embodiment]

Next, a second embodiment of the present invention will be described. A system of the second embodiment can be realized by causing the control device 100 to execute a flowchart in FIG. 8 which will be described later by using the hardware configuration shown in FIG. 1.

The system of the second embodiment has a feature in also performing catalyst temperature retaining control in addition to piston cooling control. The catalyst temperature retaining control is control for restraining temperature reduction of the exhaust gas purifying catalyst 24 when the catalyst temperature is lower than a predetermined temperature at the time of deceleration of the internal combustion engine 10. In more detail, in the catalyst temperature retaining control, the target intake air amount is decreased to decrease an exhaust gas amount, and heat is restrained from being taken away from the exhaust gas purifying catalyst 24. Whereas the piston cooling control performs intake air amount increase control that increases the target intake air amount at the time of establishment of the predetermined condition, the catalyst temperature retaining control performs intake air amount decrease control that decreases the target intake air amount. Since the intake air amount increase control and the intake air amount decrease control cannot be performed simultaneously, conditional division for executing these controls is required.

In the system of the second embodiment, intake air amount increase control is performed when the piston temperature is higher than the upper limit threshold value at the time of deceleration of the internal combustion engine 10. Thereby, the cooling performance of the piston can be quickly enhanced. Further, when the piston temperature is the upper limit threshold value or less at the time of deceleration of the internal combustion engine 10, there is no need to enhance the cooling performance of the piston. Consequently, in such a case, catalyst temperature retaining control is performed. In the catalyst temperature retaining control, intake air amount decrease control that corrects the closing degree of the throttle 30 to a degree (that is, a closing side) that decreases the intake air amount is performed, when the catalyst temperature is lower than the predetermined temperature. In the intake air amount decrease control, the control device 100 corrects the target intake air amount which is determined from the map to a smaller amount. An extent of decrease of the target intake air amount in the intake air amount decrease control is determined within a range in which the piston temperature does not exceed the upper limit threshold value. In more detail, for example, an extent of deviation of the piston temperature and the upper limit threshold value is calculated, and the extent of decrease of the target intake air amount for the piston temperature not to exceed the upper limit threshold value can be calculated on the basis of the calculated extent of deviation. Thereby, the temperature reduction of the exhaust gas purifying catalyst 24 can be restrained at the time of deceleration of the internal combustion engine 10 while an excessive increase in the piston temperature is restrained.

Figure 8:
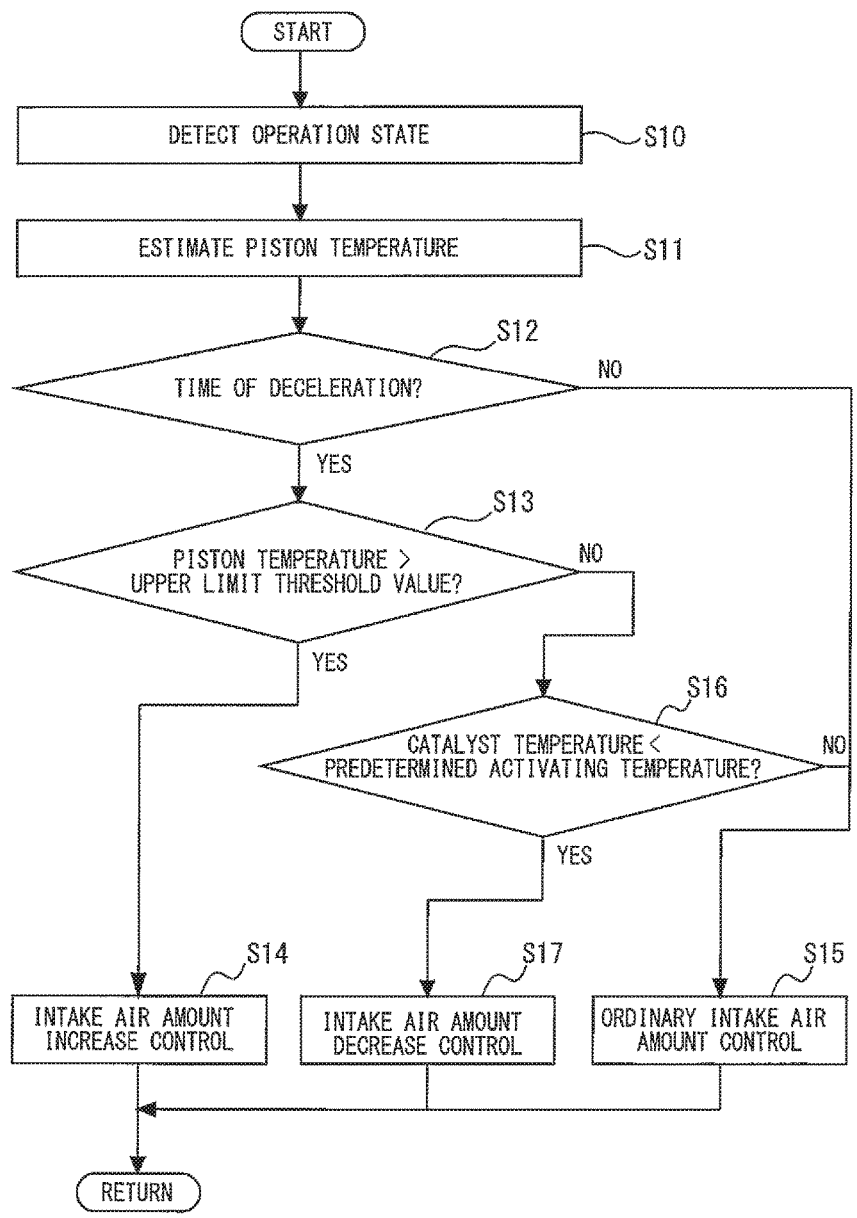
FIG. 8 is a flowchart of a routine which a system of a second embodiment of the present invention executes when performing piston cooling control.

Next, specific processing of piston cooling control which is executed in the system of the second embodiment will be described. FIG. 8 is the flowchart of a routine which the system of the present embodiment executes when performing piston cooling control. The routine shown in FIG. 8 is repeatedly executed at predetermined control periods by the control device 100.

In step S10 to step S14 of the routine shown in FIG. 8, processing similar to the processing in step S1 to step S5 of the routine shown in FIG. 6 is executed. When it is determined that the internal combustion engine 10 is not under deceleration in determination in step S12 described above, ordinary intake air amount control is executed (step S15). Here, specifically, the target intake air amount is set at a value obtained from a map. Further, when it is determined that the piston temperature is a predetermined upper limit threshold value or less in determination in step S13 described above, it is determined that the piston temperature does not increase excessively, the flow goes to a next step, and it is determined whether or not a catalyst temperature is lower than a predetermined activating temperature (step S16). As for the predetermined activating temperature, a value that is set in advance is read, as a lower limit temperature at which activation of the exhaust gas purifying catalyst 24 is kept. When the catalyst temperature is determined as the predetermined activating temperature or more as a result of the processing in step S16, special control for restraining reduction of the catalyst temperature is determined as unnecessary, and the flow goes to step S15, where ordinary intake air amount control is executed. When the catalyst temperature is determined as lower than the predetermined activating temperature as a result of the processing in step S16, special control for restraining reduction of the catalyst temperature is determined as necessary, and the flow goes to a next step, where intake air amount decrease control is executed (step S17). Here, specifically, the value of the target intake air amount which is obtained from a map is decreased. Thereby, the throttle 30 is operated to close more than in the case where intake air amount decrease control is not performed.

In this way, according to the system of the second embodiment, the intake air amount is increased when the piston temperature is likely to increase excessively, and therefore, an excessive temperature increase of the piston is restrained by enhancement of the cooling performance by intake air. Further, according to the system of the second embodiment, temperature reduction of the exhaust gas purifying catalyst 24 can be restrained when the piston temperature is unlikely to increase excessively.

Incidentally, in the system of the second embodiment described above, the closing degree of the throttle 30 is operated to the degree which decreases the intake air amount by correcting the target intake air amount to a smaller amount. However, the method for operating the closing degree of the throttle 30 to the degree which decreases the intake air amount is not limited to this, but the throttle closing degree which is the operation amount of the throttle 30 may be corrected to a predetermined closing degree (full closing, for example) that decreases the intake air amount.

In the system of the second embodiment described above, the estimated piston temperature corresponds to the "index value" of the first embodiment of the present invention, the "control device" of the first embodiment of the present invention is realized by the control device 100 executing the processing in step S11 described above, and "control device" of the first embodiment of the present invention is realized by the control device 100 executing the processing in steps S12, S13 and S14 described above. Further, "control device" of a seventh embodiment of the present invention is realized by the control device 100 executing the processing in steps S12, S13, S16 and S17 described above.

What is claimed is:

1. A control device for an internal combustion engine having an actuator regulating an intake air amount, and determining an operation amount of the actuator on the basis of operation conditions of the internal combustion engine, the control device is configured to:

calculate an index value of a piston temperature of the internal combustion engine;

correct the operation amount to an operation amount that increases the intake air amount, when the index value is a value corresponding to a higher temperature of the piston temperature than a threshold value of the index value corresponding to an upper limit threshold value of the piston temperature, at a time of deceleration in which an engine speed of the internal combustion engine decreases from a state where the internal combustion engine performs a continuous operation by a high rotation speed, wherein the upper limit threshold value of the piston temperature is a value that is determined in advance as an upper limit temperature of the piston temperature that can ensure reliability of the internal combustion engine; and correct the operation amount to an operation amount that decreases the intake air amount, when the index value is a value corresponding to a lower temperature of the piston temperature than the threshold value of the index value, and a temperature of a catalyst of the internal combustion engine is lower than a predetermined activating temperature, at the time of deceleration.

2. The control device for an internal combustion engine according to claim 1, wherein the control device is configured to correct the operation amount so as to increase an extent of increase of the intake air amount more, as the index value is a value corresponding to a higher temperature of the piston temperature than the threshold value of the index value.

3. The control device for an internal combustion engine according to claim 1, wherein a piston of the internal combustion engine is a piston made of steel.

4. The control device for an internal combustion engine according to claim 1, wherein the control device is configured to perform fuel cut at the time of deceleration.

5. The control device for an internal combustion engine according to claim 1, wherein the control device is configured to calculate the piston temperature which is estimated from a deviation between an inputted heat amount and a heat release amount of the piston of the internal combustion engine as the index value.

6. The control device for an internal combustion engine according to claim 1, wherein the control device is configured to calculate a volumetric efficiency of the internal combustion engine as the index value.

* * * * *